United States Patent
Yu et al.

(10) Patent No.: US 12,008,696 B2
(45) Date of Patent: Jun. 11, 2024

(54) TRANSLATION METHOD AND AR DEVICE

(71) Applicant: BEIJING XIAOMI MOBILE SOFTWARE CO., LTD., Beijing (CN)

(72) Inventors: Zhixiong Yu, Beijing (CN); Zifei Dou, Beijing (CN); Xiang Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/707,690

(22) Filed: Mar. 29, 2022

(65) Prior Publication Data
US 2023/0083505 A1 Mar. 16, 2023

(30) Foreign Application Priority Data
Sep. 14, 2021 (CN) .......................... 202111076976.3

(51) Int. Cl.
*G06T 11/60* (2006.01)
*G06F 3/01* (2006.01)
*G06F 40/58* (2020.01)
*G06V 30/14* (2022.01)
*G06V 40/20* (2022.01)

(52) U.S. Cl.
CPC .............. *G06T 11/60* (2013.01); *G06F 3/017* (2013.01); *G06F 40/58* (2020.01); *G06V 30/1456* (2022.01); *G06V 40/28* (2022.01)

(58) Field of Classification Search
CPC .............. G06T 11/60; G06T 2219/2016; G06T 19/006; G06T 19/20; G06F 3/017; G06F 40/58; G06F 3/011; G06V 30/1456; G06V 40/28
See application file for complete search history.

(56) References Cited

U.S. PATENT DOCUMENTS

| | | | |
|---|---|---|---|
| 9,092,674 B2* | 7/2015 | Andrade | G06F 40/58 |
| 9,317,500 B2* | 4/2016 | Hwang | G06F 40/45 |
| 10,394,964 B2* | 8/2019 | Deshmukh | G06F 3/018 |
| 10,482,675 B1* | 11/2019 | Sutter | G06T 19/006 |
| 10,580,213 B2* | 3/2020 | Browy | G02B 27/0172 |
| 2013/0108115 A1* | 5/2013 | Hwang | G06V 30/127 382/161 |
| 2014/0081620 A1* | 3/2014 | Solntseva | G06F 3/04883 704/3 |
| 2014/0129207 A1* | 5/2014 | Bailey | G06F 40/58 704/2 |
| 2017/0286405 A1* | 10/2017 | Deshmukh | G06F 3/0484 |

(Continued)

OTHER PUBLICATIONS

V. Fragoso, S. Gauglitz, S. Zamora, J. Kleban and M. Turk, "TranslatAR: A mobile augmented reality translator," 2011 IEEE Workshop on Applications of Computer Vision (WACV), Kona, HI, USA, 2011, pp. 497-502 (Year: 2011).*

(Continued)

*Primary Examiner* — Motilewa Good-Johnson
(74) *Attorney, Agent, or Firm* — COZEN O'CONNOR (57) ABSTRACT

A translation method is performed by an augmented reality (AR) device. The method includes obtaining a text to be translated from an environment image in response to a translation trigger instruction; obtaining a translation result of the text to be translated; and displaying the translation result based on a preset display mode in an AR space. The AR space is a virtual space constructed by the AR device based on a real environment.

17 Claims, 2 Drawing Sheets

(56) References Cited

U.S. PATENT DOCUMENTS

| | | | | |
|---|---|---|---|---|
| 2018/0047395 A1* | 2/2018 | Sommers | ............... | H04N 7/157 |
| 2018/0075659 A1* | 3/2018 | Browy | ................... | G06F 40/58 |
| 2019/0362557 A1* | 11/2019 | Lacey | ....................... | G06T 5/20 |
| 2020/0134026 A1* | 4/2020 | Lovitt | ..................... | G10L 15/22 |
| 2020/0380793 A1* | 12/2020 | Browy | ................. | G06F 1/1686 |
| 2020/0409469 A1* | 12/2020 | Kannan | .................. | G06Q 50/20 |
| 2021/0397644 A1* | 12/2021 | DeLuca | ................ | G06F 16/532 |
| 2021/0407205 A1* | 12/2021 | Canberk | ................ | G06V 40/10 |
| 2022/0375177 A1* | 11/2022 | Browy | ................ | G02B 27/017 |
| 2023/0083505 A1* | 3/2023 | Yu | ........................... | G06T 19/20 |

OTHER PUBLICATIONS

Takumi Toyama, Daniel Sonntag, Andreas Dengel, Takahiro Matsuda, Masakazu Iwamura, and Koichi Kise. 2014. A mixed reality head-mounted text translation system using eye gaze input. IUI'14, ACM, pp. 329-334 (Year: 2014).*

European Patent Application No. 22165593.9, Search and Opinion dated Sep. 22, 2022, 6 pages.

* cited by examiner

TRANSLATION METHOD AND AR DEVICE

CROSS REFERENCE TO RELATED APPLICATIONS

This application claims priority to Chinese Patent Application No. 202111076976.3, filed on Sep. 14, 2021, the entire content of which is incorporated herein by reference.

TECHNICAL FIELD

The disclosure relates to a technical field of augmented reality devices, in particular to a translation method and apparatus, AR glasses, a storage medium and a computer program product.

BACKGROUND

Augmented reality (AR) glasses are a wearable device. When users wear the AR glasses, they can see pictures of virtual objects superimposed on a physical environment. At present, more and more AR glasses appear in the public view. The emergence of AR glasses greatly facilitates the daily life of users.

SUMMARY

According to a first aspect of the disclosure, a translation method is performed by an AR device. The method includes: obtaining a text to be translated from an environment image in response to a trigger instruction; obtaining a translation result of the text to be translated; and displaying the translation result based on a preset display mode in an AR space. The AR space is a virtual space constructed by the AR device based on a real environment.

According to a second aspect of the disclosure, an augmented reality (AR) device includes a frame, a camera, a microphone, a processor and a memory arranged on the frame. The camera is configured to collect an environment image. The microphone is configured to receive a trigger instruction sent by a user. The memory is configured to store instructions executable by the processor. The processor is configured to obtain a text to be translated from the environment image in response to a trigger instruction; obtain a translation result of the text to be translated and control display of the translation result based on a preset display mode in an AR space, wherein the AR space is a virtual space constructed by the AR device based on a real environment.

According to an embodiment of the disclosure, a non-transitory computer readable storage medium has a computer program stored thereon. When the computer program is performed by a processor, the above translation method described in the first aspect is carried out.

It should be understood that, the above general descriptions and detailed descriptions are illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification, which does not constitute an improper limitation of the present disclosure.

DETAILED DESCRIPTION

In order to enable those skilled in the art to better understand the technical solution of the present disclosure, the technical solution in the embodiments of the present disclosure may be clearly and completely described below in combination with the accompanying drawings.

It should be noted that, the terms "first", "second" and the like in the description and claims of the present disclosure and the above drawings are used to distinguish similar objects, and need not be used to describe a specific order or a precedence order. It should be understood that the data so used can be interchanged where appropriate so that the embodiments of the present disclosure described herein can be implemented in an order other than those illustrated or described herein. The embodiments described in the following embodiments do not represent all embodiments consistent with the present disclosure. Rather, they are merely examples of the apparatuses and methods consistent with some aspects of the present disclosure as detailed in the following claims.

At present, the AR glasses lack a translation function for text appearing in a user's vicinity. To solve the technical problem, in some embodiments of the present disclosure, the AR glasses collect an image from the current environment; in response to the translation trigger instruction, the text to be translated is obtained from the current environment image; the translation result is obtained based on the text to be translated; the translation result is controlled for display to the user based on the preset display mode in the AR space, where the AR space is a virtual space constructed by the AR glasses based on the current real environment. The AR glasses of the disclosure translate the text to be translated existing in the current environment image, and display the translation result to the user based on the preset display mode in the AR space, thus improving the user experience.

The technical solutions according to the embodiments of the present disclosure are described in detail below in combination with the accompanying drawings.

Figure 1:
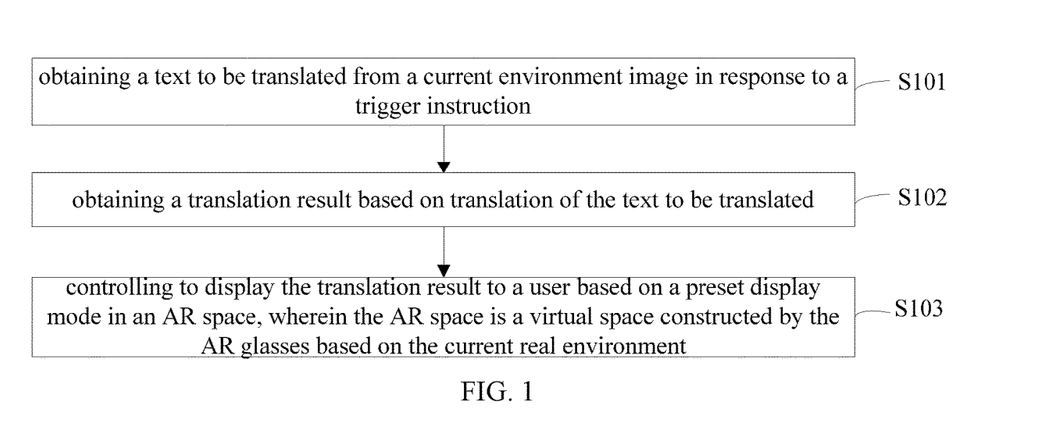
FIG. 1 is a flowchart of a translation method according to an embodiment of the disclosure.

FIG. 1 is a flowchart of a translation method according to an embodiment of the present disclosure. As shown in FIG. 1, the method includes the following steps at S101-S103.

At S101, in response to a translation trigger instruction, a text to be translated is obtained from a current environment image.

At S102, a translation result is obtained based on translation of the text to be translated.

At S103, the translation result is controlled for display to a user based on a preset display mode in the AR space, where the AR space is a virtual space constructed by an augmented reality (AR) device based on the current real environment.

In some possible embodiments, the above method may be executed in an AR device, such as a pair of AR glasses. Embodiments disclosed herein do not limit the type of AR glasses, which can be monocular AR glasses or binocular AR glasses.

The AR glasses capture the real world through camera devices (such as cameras). Users may input instructions to the AR glasses through a voice, a gesture and the like. The AR glasses use computer vision technology and artificial intelligence technology to understand the surrounding environment and recognize interaction at the same time. The image is processed by a virtual image rendering engine and finally output through the display technology, thus achieving the virtual reality fusion effect.

In the embodiment, when the user wears the AR glasses, the AR glasses collect a current environment image through the camera set on the AR glasses. The current environment image is obtained by collecting the current real environment. In an example, in some possible implementations, the AR glasses can collect the current environment image through an imaging device equipped on the AR glasses in response to receiving the translation trigger instruction, so that image acquisition can be realized based on user needs. In an example, in some possible implementations, the imaging device of AR glasses can be in a normally open state, or activate the imaging device to collect the current environment image in response to detecting that the user is wearing AR glasses. In this way, the user response can be realized more quickly.

In the embodiment, the AR glasses obtain the text to be translated from the current environment image in response to the translation trigger instruction. In a possible implementation, in response to the translation trigger instruction, the text image to be translated is obtained from the current environment image; the text to be translated is obtained by image recognition of the image of the text to be translated. In an example, the user gesture can be collected through the imaging device (such as a camera) equipped on the AR glasses. When the user gesture conforms to a set gesture of the preset translation trigger operation, the AR glasses receive the translation trigger instruction. In an example, the user voice can be collected through a microphone device equipped on the AR glasses, the user voice instruction can be recognized through AI recognition technology, and it can be determined that the translation trigger instruction is received based on the user voice instruction. In an example, it can be determined that the translation trigger instruction is received by detecting a preset operation of a key (such as a mechanical key or a touch sensing key) equipped on the AR glasses. In some possible embodiments, the above three examples can be used in combination with each other.

In the above embodiment, the methods for the AR glasses to obtain the text to be translated include but are not limited to the following Manner 1 to Manner 5.

Manner 1

The AR glasses obtain an image of the text to be translated from the current environment image in response to the translation trigger instruction; the AR glasses obtain the text to be translated by performing image recognition on the image of the text to be translated.

Manner 2

The AR glasses send the current environment image to an interaction device bound with the AR glasses in response to the translation trigger instruction. The interaction device obtains an image of the text to be translated from the current environment image. The interaction device obtains the text to be translated by recognizing the image of the text to be translated, and sends the text to be translated to the AR glasses. The AR glasses receive the text to be translated. The interaction device can be, for example, a mobile phone bound to the AR glasses.

Manner 3

The AR glasses obtain an image of the text to be translated from the current environment image in response to the translation trigger instruction; the AR glasses send the image of the text to be translated to an interaction device. After receiving the image of the text to be translated, the interaction device obtains the text to be translated by recognizing the image of the text to be translated. The interaction device sends the text to be translated to the AR glasses, and the AR glasses receive the text to be translated. The interaction device can be, for example, a mobile phone bound to the AR glasses.

Manner 4

The AR glasses upload the current environment image to a server in response to the translation trigger instruction. The server obtains an image of the text to be translated from the current environment image. The server obtains the text to be translated by recognizing the image of the text to be translated. The server sends the text to be translated to the AR glasses, and the AR glasses receive the text to be translated.

Manner 5

The AR glasses obtain an image of the text to be translated from the current environment image in response to the translation trigger instruction. The AR glasses send the image of the text to be translated to a server. After receiving the image of the text to be translated, the server obtains the text to be translated by recognizing the image of the text to be translated. The server sends the text to be translated to the AR glasses and the AR glasses receive the text to be translated.

After acquiring the image of the text to be translated, the AR glasses obtain the text to be translated from the current environment image based on the image of the text to be translated.

In the above embodiment, obtaining by the AR glasses, the image of the text to be translated from the current environment image in response to the translation trigger instruction includes but not limited to the following Manner 1 to Manner 3.

Manner 1

The AR glasses obtain an image of the text to be translated by inputting the current environment image into an existing text image recognition model in response to a translation trigger instruction sent by the user in voice. In the acquisition manner, after the user finds that there is a text to be translated in a real environment from the AR glasses, the user sends a translation trigger instruction in voice. For example, the user sends a "translation" voice, the AR glasses obtain the image of the text to be translated by inputting the current environment image into the existing text image recognition model in response to the translation trigger instruction.

Manner 2

The AR glasses generate a translation trigger instruction in response to recognizing a text image from the current environment image; the AR glasses determine the text image as the image of the text to be translated based on the translation trigger instruction. In the acquisition manner, the AR glasses input the collected current environment image into the existing text image recognition model. After recognizing the text image, the AR glasses generate a translation trigger instruction; the AR glasses determine the recognized text image as the image of the text to be translated based on the translation trigger instruction.

Manner 3

A user gesture in the current environment image is recognized; a target text image pointed by the user gesture is determined based on the user gesture; a translation trigger instruction is generated based on the target text image; the target text image is regarded as the image of the text to be translated based on the translation trigger instruction. In the acquisition manner, the AR glasses use the gesture recognition model to recognize the user gesture in the current environment image, and determine the target text image pointed by the user gesture based on the user gesture. The translation trigger instruction is generated based on the target text image. The AR glasses take the target text image as the image of the text to be translated based on the translation trigger instruction.

In the above Manner 3, the AR glasses determine the target text image pointed by the user gesture based on the user gesture. In a possible implementation, the AR glasses recognize a (gesture pointing) direction of the user gesture in the current environment image and at least one first text image in the current environment image. A text image of at least one first text image along a line pointed by the gesture is taken as the target text image. For example, the AR glasses use an existing gesture recognition model to recognize the user gesture, and use the existing text image recognition model to recognize at least one first text image in the current environment image. The line pointed by the gesture is drawn in the first text image. When there is a text image in the current environment image, the text image is taken as the target text image.

In another possible implementation, the AR glasses collect a new environment image based on the user gesture. A (gesture pointing) direction of the user gesture in the new environment image is recognized together with at least one second text image in the new environment image. A text image of at least one second text image along a line pointed by the gesture is taken as the target text image. For example, after recognizing the user gesture from the current environment image, the AR glasses is rotated towards the corresponding direction of the user gesture to collect a new environment image. The AR glasses recognize the gesture pointing direction of the user gesture in the new environment image by using the gesture recognition model, and recognize at least one second text image in the new environment image by using the existing text recognition model. A text image in at least one second text image along the line pointed by the gesture is taken as the target text image.

In a possible embodiment, after the image of the text to be translated is obtained from the current environment image, the AR glasses can control the display of the image of the text to be translated in the AR space. The image of the text to be translated is displayed via the AR glasses, which on one hand, is convenient for users to view the translated text image through AR glasses and on the other hand, is also convenient for users to operate and edit the image of the text to be translated through AR glasses. In an example, the image of the text to be translated displayed by AR glasses covers an image of the text to be translated in the real environment. That is, the image of the text to be translated displayed by the AR glasses may cover a "real scene" of the text to be translated, which can reduce a repeated display of the text to be translated in front of the user. In an example, the text image to be translated displayed by the AR glasses may cover an image of the text to be translated in the real environment, thus hiding the "real scene" of the text to be translated. For example, the background transparency and/or color of the image area of the text to be translated can be adjusted to reduce the influence of "real scene" of the text to be translated.

In an example, the image of the text to be translated can be displayed in the AR space in at least one of the following display styles: a gradually increased display size, a gradually increased transparency of a text background, highlighted marking, underlined marking, and displaying a preset color. For example, the display size of the image of the text to be translated in the AR space gradually increases until the image of the text to be translated covers the real text image in the environment. For another example, the text background transparency of the image of the text to be translated gradually increases in the AR space, thus highlighting the text content itself of the image of the text to be translated and improving the user experience.

After the image of the text to be translated is obtained by the AR glasses, gestures may be made to operate the image of the text to be translated. In a possible implementation, a target operation gesture is obtained for the image of the text to be translated displayed in the AR space. A target operation mode is selected based on the target operation gesture from a mapping relationship table between operation gestures and operation modes. The target operation mode is configured to operate the image of the text to be translated displayed in the AR space. For example, a gesture with a palm facing up and fingers open corresponds to an operation of zooming out an image, and a fist gesture corresponds to an operation of zooming in an image, an OK gesture corresponds to an operation of gradually increasing the transparency of the image text background. When it is detected that the OK gesture for the image of the text to be translated displayed in the AR space, the text background transparency is gradually increased for the image of the text to be translated. When the hand is removed from the AR space, increasing the text background transparency of the image of the text to be translated is disabled.

In a possible implementation, the AR glasses obtain a display screen interface image from the current environment image. The display screen interface image is a virtual image corresponding to an interface displayed on an electronic display screen of a real display device in the current environment. The AR glasses control display of the display screen interface image to the user in the AR space. The display screen interface image includes the image of the text to be translated. The display screen interface image covers the electronic display screen of the real display device in the current environment. For example, there are mobile phones in the current environment. The interface displayed on the mobile phone screen contains a text image. The AR glasses obtain the display screen interface image by inputting the current environment image into the existing display screen interface image recognition model. The AR glasses control the display screen interface image to the user in the AR space. In an example, the AR glasses can be switched from the current AR mode to a virtual reality (VR) mode to clearly display the display screen interface image in the AR space.

In an example, the display screen interface image displayed by the AR device may cover the electronic display screen of the display device in the real environment, so that a real scene displayed in the electronic display screen may be concealed to some extent, and the user may easily operate to edit the image of the text to be translated included in the display screen interface image through the AR device. In this embodiment, obtaining by the AR glasses the translation result based on translation of the text to be translated includes but not limited to the following manners of translation result acquisition.

Manner 1

The AR glasses obtain a translation result sent by an interaction device bound with the AR glasses. In the acquisition manner, the interaction device translates the text to be translated and obtains the translation result. The interaction device sends the translation result to the AR glasses, and the AR glasses receive the translation result sent by the interaction device.

Manner 2

The AR glasses obtain a translation result sent by a cloud server, where the translation result is generated based on the text to be translated sent by the AR glasses or interaction device. In the acquisition manner, the cloud server translates the text to be translated uploaded by the AR glasses or interaction device, and obtains the translation result. The cloud server sends the translation result to the AR glasses and the AR glasses receive the translation result sent by the cloud server.

Manner 3

The AR glasses obtain the text to be translated sent by the interaction device and generate the translation result by translating the text to be translated. In the acquisition manner, the interaction device sends the text to be translated to the AR glasses. After receiving the text to be translated, the AR glasses generate the translation result by translating the text to be translated.

In one possible embodiment, after obtaining the translation result, the AR glasses display the translation result in the AR space based on the preset display mode. In this way, the visual effect of translation result can be improved, which is conducive to intuitive viewing of the users. In a possible implementation, the display definition and/or display font size of the translation result is adjusted in the AR space. For example, the display definition of the translation result is gradually reduced in the AR space, and the display font size of the translation result is gradually increased.

In a possible embodiment, the AR space may be constructed by spatial mapping based on the real environment. For example, the real space environment can be mapped to the real space through SLAM technology to construct the AR space.

Figure 2:
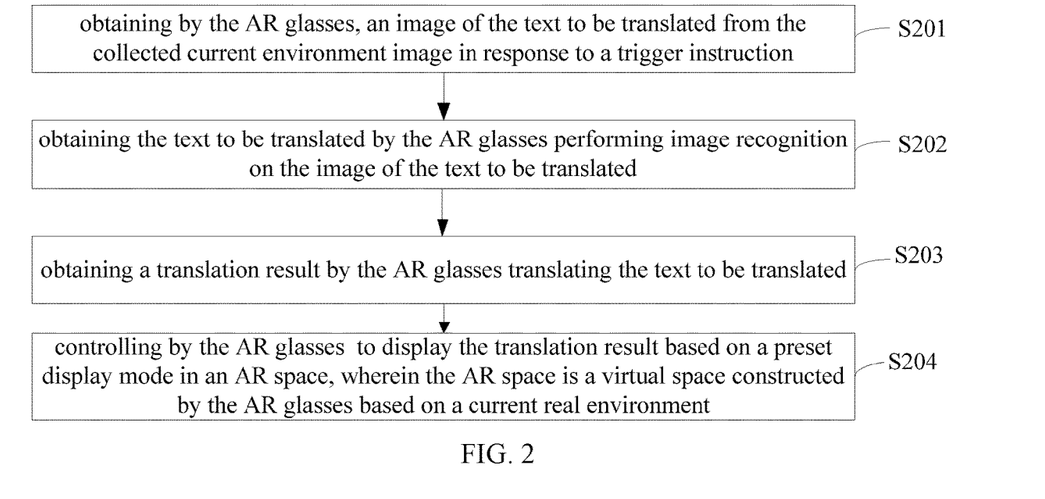
FIG. 2 is a flowchart of another translation method according to an embodiment of the disclosure.

FIG. 2 is a flowchart of another translation method according to an embodiment of the present disclosure. As shown in FIG. 2, the method includes the following steps at S201-S204.

At S201, in response to a translation trigger instruction, an image of a text to be translated is obtained by AR glasses from the collected current environment image.

At S202, the text to be translated is obtained by the AR glasses performing image recognition on the image of the text to be translated.

At S203, a translation result is obtained by the AR glasses translating the text to be translated.

At S204, the translation result is controlled by the AR glasses to display to the user based on a preset display mode in an AR space, where the AR space is a virtual space constructed by the AR glasses based on the current real environment.

In the embodiment, the implementation of each execution step in the above method can be described in the corresponding part of the above embodiments, which may not be repeated here. Similarly, the embodiment can obtain the beneficial effects of the above embodiments.

Figure 3:
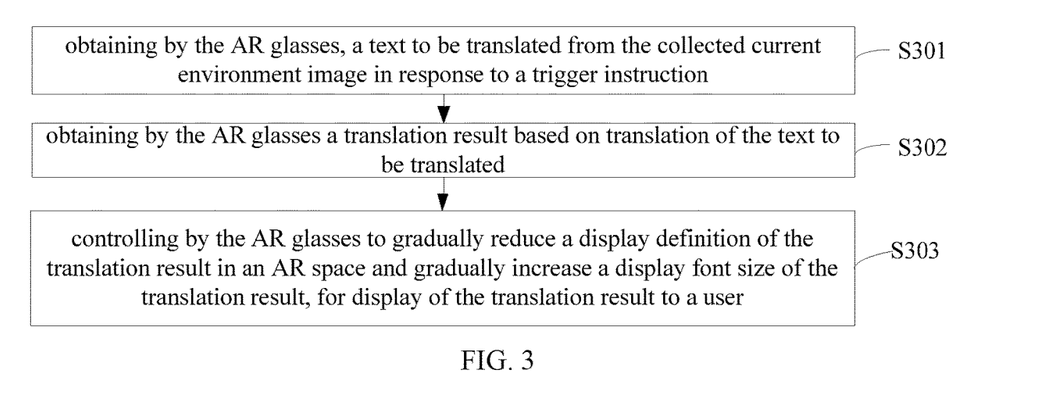
FIG. 3 is a flowchart of another translation method according to an embodiment of the disclosure.

FIG. 3 is a flowchart of another translation method according to an embodiment of the present disclosure. As shown in FIG. 3, the method includes the steps at S301-S303.

At S301, in response to a translation trigger instruction, a text to be translated is obtained by AR glasses from the collected current environment image.

At S302, a translation result is obtained by the AR glasses based on translation of the text to be translated.

At S303, the translation result is displayed to a user by the AR glasses controlling to gradually reduce a display definition of the translation result in an AR space, and gradually increase a display font size of the translation result. Similarly, this embodiment can obtain the beneficial effects of the above embodiments.

In this embodiment, the implementation of each execution step in the above method can be described in the corresponding part of the above embodiments, which may not be repeated here.

In the above method embodiment of the present disclosure, the AR glasses collect the current environment image; in response to the translation trigger instruction, the text to be translated is obtained from the current environment image; the translation result is obtained based on translation of the text to be translated; the translation result is controlled for display to the user based on the preset display mode in the AR space, where the AR space is a virtual space constructed by AR glasses based on the current real environment. The AR glasses of the disclosure translates the text to be translated existed in the current environment image, and controls to display the translation result to the user in the AR space based on the preset display mode, thus improving the user experience.

Figure 4:
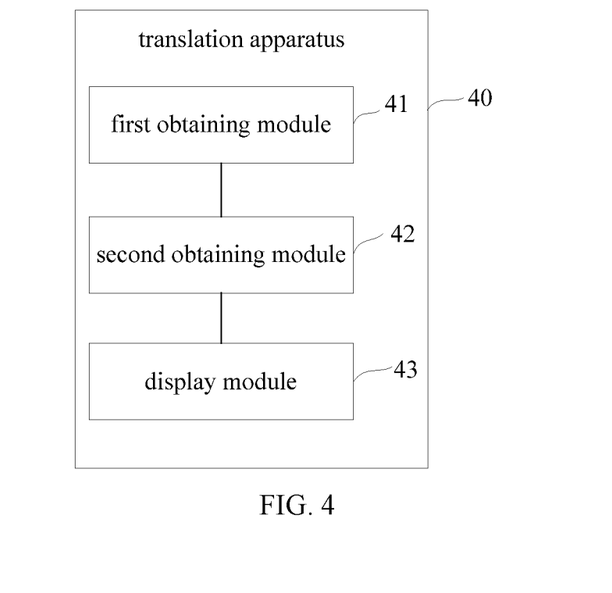
FIG. 4 is a structural diagram of a translation apparatus according to an embodiment of the disclosure.

FIG. 4 is a structural diagram of a translation apparatus 40 according to an embodiment of the present disclosure. As shown in FIG. 4, the translation apparatus 40 includes a first obtaining module 41, a second obtaining module 42 and a display module 43.

The first obtaining module 41 is configured to obtain a text to be translated from a current environment image in response to a translation trigger instruction.

The second obtaining module 42 is configured to obtain a translation result based on translation of the text to be translated.

The display module 43 is configured to control display of the translation result to a user based on a preset display mode in an AR space, where the AR space is a virtual space constructed by the AR glasses based on a current real environment.

When the text to be translated is obtained from the current environment image in response to the translation trigger instruction, the first obtaining module 41 is specifically configured to: obtain an image of the text to be translated from the current environment image in response to the translation trigger instruction; and obtain the text to be translated by performing image recognition on the image of the text to be translated.

Alternatively, when the image of the text to be translated is obtained from the current environment image in response to the translation trigger instruction, the first obtaining module 41 is specifically configured to obtain the image of the text to be translated by inputting the current environment image into an existing text image recognition model in response to a translation trigger instruction generated by the user making a voice.

Alternatively, when the image of the text to be translated is obtained from the current environment image in response to the translation trigger instruction, the first obtaining module 41 is specifically configured to: generate the translation trigger instruction in response to a text image being recognized from the current environment image and determine the text image as the image of the text to be translated based on the translation trigger instruction.

Alternatively, when the image of the text to be translated is obtained from the current environment image in response to the translation trigger instruction, the first obtaining module 41 is specifically configured to: recognize a user gesture in the current environment image; determine a target text image pointed by the user gesture based on the user gesture; generate the translation trigger instruction based on the target text image; and determine the target text image as the image of the text to be translated based on the translation trigger instruction.

Alternatively, when the target text image pointed by the user gesture is determined based on user gesture, the first obtaining module 41 is specifically configured to: recognize a direction of the user gesture in the current environment image and at least one first text image in the current environment image; determine a text image of the at least one first text image along a line pointed by the gesture as the target text image; or collect a new environment image based on the user gesture; recognizing a direction of the user gesture in the new environment image and at least one second text image in the new environment image; determine a text image of the at least one second text image along a line pointed by the gesture as the target text image.

Alternatively, after the image of the text to be translated is obtained from the current environment image, the method also includes: controlling to display the image of the text to be translated in the AR space.

Alternatively, when the image of the text to be translated is controlled for display in the AR space, the display module 43 is specifically configured to: obtain a display screen interface image from the current environment image, in which the display screen interface image is a virtual image corresponding to an interface displayed on an electronic display screen of a real display device in the current environment; and control display of the display screen interface image to the user in the AR space, in which the display screen interface image includes the image of the text to be translated, and the display screen interface image covers the electronic display screen of the real display device in the current environment.

Alternatively, the display module 43 controls the image of the text to be translated to be displayed in the AR space in at least one of the following display styles: a gradually increased display size, a gradually increased transparency of a text background, highlighted marking, underlined marking, and displaying a preset color.

Alternatively, the first obtaining module 41 can also be configured to: obtain a target operation gesture for the image of the text to be translated displayed in the AR space; and select a target operation mode for operating the image of the text to be translated displayed in the AR space based on the target operation gesture from a mapping relationship table between operation gestures and operation modes.

Alternatively, the second obtaining module 42 obtains the translation result based on translation of the text to be translated in at least one of the following ways: obtaining a translation result sent by an interaction device bound to the AR glasses; obtaining a translation result sent by a cloud server, wherein the translation result is generated based on the text to be translated sent by the AR glasses or the interaction device; and obtaining the text to be translated sent by the interaction device, and generating the translation result by translating the text to be translated.

Alternatively, when the translation result is displayed in the AR space based on the preset display mode, the display module 43 is specifically configured to adjust a display definition and/or a display font size of the translation result in the AR space.

Alternatively, when the display definition and/or display font size of the translation result is adjusted in the AR glasses, the display module 43 is specifically configured to gradually reduce the display definition of the translation result in the AR space and gradually increase the display font size of the translation result.

In the above apparatus embodiments of the present disclosure, the AR glasses obtain the text to be translated from the current environment image in response to the translation trigger instruction; the translation result is obtained based on translation of the text to be translated; and the translation result is controlled for display to the user based on the preset display mode in the AR space, where the AR space is a virtual space constructed by the AR glasses based on the current real environment. The AR glasses of the disclosure translates the text to be translated existed in the current environment image, and controls to display the translation result to the user in the AR space based on the preset display mode, thus improving the user experience.

Figure 5:
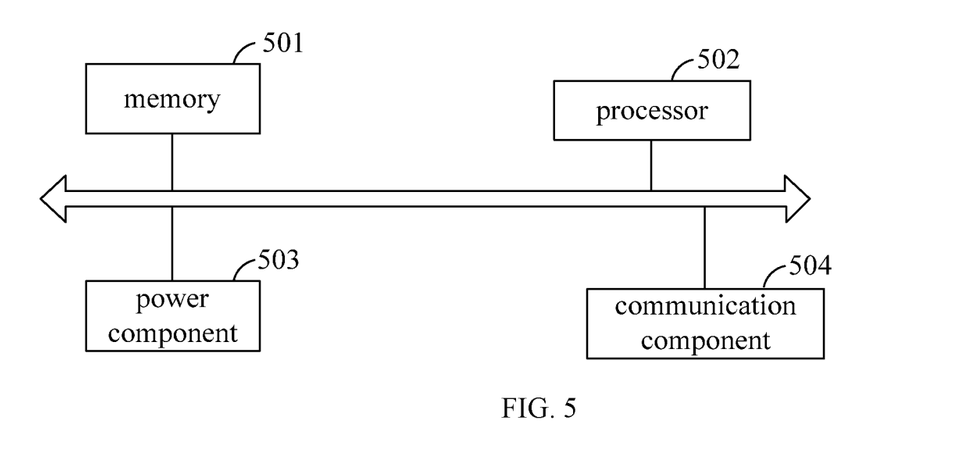
FIG. 5 is a schematic diagram of AR glasses according to an embodiment of the disclosure.

FIG. 5 is a schematic diagram of an AR glasses according to an embodiment of the present disclosure. As shown in FIG. 5, the AR glasses include a glasses frame, a camera, an audio component, a memory 501 and a processor 502 that are arranged on the glasses frame. In addition, the AR glasses also include some components such as a power component 503 and a communication component 504.

The memory 501 is stored with computer programs and may be configured to store various other data to support operations on the AR glasses. Examples of these data include instructions for any application or method operating on the AR glasses.

The memory 501 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or disc.

The communication component 504 is configured to perform data transmission with other devices.

The processor 502 can execute the computer instructions stored in the memory 501 and configured to: obtaining a text to be translated from a current environment image in response to a translation trigger instruction; obtaining a translation result based on translation of the text to be translated; and controlling to display the translation result to a user based on a preset display mode in an AR space, in which the AR space is a virtual space constructed by the AR glasses based on the current real environment.

Alternatively, when the text to be translated is obtained from the current environment image in response to the translation trigger instruction, the processor 502 is specifically configured to: obtain an image of the text to be translated from the current environment image in response to the translation trigger instruction; and obtain the text to be translated by performing image recognition on the image of the text to be translated.

Alternatively, when the image of the text to be translated is obtained from the current environment image in response to the translation trigger instruction, the processor 502 is specifically configured to obtain the image of the text to be translated by inputting the current environment image into an existing text image recognition model in response to a translation trigger instruction generated by the user making a voice.

Alternatively, when the image of the text to be translated is obtained from the current environment image in response to the translation trigger instruction, the processor 502 is specifically configured to: generate the translation trigger instruction in response to a text image being recognized from the current environment image and determine the text image as the image of the text to be translated based on the translation trigger instruction.

Alternatively, when the image of the text to be translated is obtained from the current environment image in response to the translation trigger instruction, the processor 502 is specifically configured to: recognize a user gesture in the current environment image; determine a target text image pointed by the user gesture based on the user gesture; generate the translation trigger instruction based on the target text image; and determine the target text image as the image of the text to be translated based on the translation trigger instruction.

Alternatively, when the target text image pointed by the user gesture is determined based on user gesture, the processor 502 is specifically configured to: recognize a direction of the user gesture in the current environment image and at least one first text image in the current environment image; determine a text image of the at least one first text image along a line pointed by the gesture as the target text image; or collect a new environment image based on the user gesture; recognizing a direction of the user gesture in the new environment image and at least one second text image in the new environment image; determine a text image of the at least one second text image along a line pointed by the gesture as the target text image.

Alternatively, after the image of the text to be translated is obtained from the current environment image, the processor 502 can also be configured to control display of the image of the text to be translated in the AR space.

Alternatively, when the image of the text to be translated is controlled for display in the AR space, the processor 502 is specifically configured to: obtain a display screen interface image from the current environment image, in which the display screen interface image is a virtual image corresponding to an interface displayed on an electronic display screen of a real display device in the current environment; and control display of the display screen interface image to the user in the AR space, in which the display screen interface image includes the image of the text to be translated, and the display screen interface image covers the electronic display screen of the real display device in the current environment.

Alternatively, the processor 502 controls the image of the text to be translated to be displayed in the AR space in at least one of the following display styles: a gradually increased display size, a gradually increased transparency of a text background, highlighted marking, underlined marking, and displaying a preset color.

Alternatively, the processor 502 can also be configured to: obtain a target operation gesture for the image of the text to be translated displayed in the AR space; and select a target operation mode for operating the image of the text to be translated displayed in the AR space based on the target operation gesture from a mapping relationship table between operation gestures and operation modes.

Alternatively, the processor 502 obtains the translation result based on translation of the text to be translated in at least one of the following ways: obtaining a translation result sent by an interaction device bound to the AR glasses; obtaining a translation result sent by a cloud server, wherein the translation result is generated based on the text to be translated sent by the AR glasses or the interaction device; and obtaining the text to be translated sent by the interaction device, and generating the translation result by translating the text to be translated.

Alternatively, when the translation result is displayed in the AR space based on the preset display mode, the processor 502 is specifically configured to adjust a display definition and/or a display font size of the translation result in the AR space.

Alternatively, when the display definition and/or display font size of the translation result is adjusted in the AR glasses, the processor 502 is specifically configured to gradually reduce the display definition of the translation result in the AR space and gradually increase the display font size of the translation result.

Accordingly, the embodiment of the present disclosure also provides a non-transitory computer-readable storage medium having stored a computer program. When the computer program is executed by one or more processors, one or more processors are caused to perform the steps in the embodiment of the method of FIG. 1.

Accordingly, the embodiment of the present disclosure also provides a computer program product. The computer program product includes computer programs/instructions, and the computer programs/instructions are executed by the processor, each step of the translation method of FIG. 1 is carried out.

The above communication component in FIG. 5 is configured to facilitate wired or wireless communication between a device where the communication component is located and other devices. The device where the communication component is located can access wireless networks based on communication standards, e.g., mobile communication networks such as WiFi, 2G, 3G, 4G/LTE, 5G and their combinations. In an embodiment, the communication component receives broadcast signals or broadcast related information from an external broadcast management system via a broadcast channel. In an embodiment, the communication component also includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

The above power component in FIG. 5 provides power to various components of the device where the power component is located. The power component may include a power management system, one or more power supplies, and other components associated with generating, managing, and distributing power for the device where the power component is located.

The display includes a screen, which can include a liquid crystal display (LCD) and a touch panel (TP). If the screen includes a touch panel, the screen can be implemented as a touch screen to receive an input signal from the user. The touch panel includes one or more touch sensors to sense touch, slide and gestures on the touch panel. The touch sensor can not only sense a boundary of the touch or slide operation, but also detect a duration and pressure related to the touch or slide operation.

The audio component that can be configured to output and/or input audio signals. For example, the audio component includes a microphone (MIC), which is configured to receive external audio signals when the device where the audio component is located is in operation modes, such as a call mode, a recording mode and a speech recognition mode. The received audio signals may be further stored in a memory or transmitted via a communication component. In some embodiments, the audio component also includes a speaker for outputting an audio signal.

In the embodiment of the above apparatus, storage medium and computer program product of the present disclosure, the AR glasses obtain the text to be translated from the current environment image in response to the translation trigger instruction; the translation result is obtained based on translation of the text to be translated; and the translation result is controlled for display to the user based on the preset display mode in the AR space, where the AR space is a virtual space constructed by the AR glasses based on the current real environment. The AR glasses of the disclosure translates the text to be translated existed in the current environment image, and controls to display the translation result to the user in the AR space based on the preset display mode, thus improving the user experience.

It should be understood by those skilled in the art that embodiments of the present disclosure may be provided as a method, a system, or a computer program product. Therefore, the disclosure can take the form of a complete hardware embodiment, a complete software embodiment, or an embodiment combining software and hardware. Further, the disclosure may take the form of a computer program product implemented on one or more computer usable storage media (including but not limited to a disk memory, a CD-ROM, an optical memory, etc.) containing computer usable program codes.

The disclosure is described with reference to flowcharts and/or block diagrams of the method, apparatus (system), and computer program product according to the embodiments of the disclosure. It should be understood that each process in the flowchart and/or each block in the block diagram and a combination of processes in the flowchart and/or blocks in the block diagram can be realized by computer program instructions. These computer program instructions can be provided to the processor of a general-purpose computer, a special-purpose computer, an embedded processor or other programmable data processing device to generate a machine, so that the instructions executed by a processor of a computer or other programmable data processing device generate an apparatus that is configured to carry out the functions specified in one or more processes of the flowchart and/or one or more blocks of the block diagram.

These computer program instructions may also be stored in a computer-readable memory that can guide a computer or other programmable data processing device to work in a specific manner, so that the instructions stored in the computer-readable memory generate a manufacturing product including an instruction device. The instruction device realizes the functions specified in one or more processes of the flowchart and/or one or more blocks of the block diagram.

These computer program instructions can also be loaded on a computer or other programmable data processing device so that a series of operation steps are performed on the computer or other programmable device to produce computer implemented processing. Thus, instructions executed on a computer or other programmable device provide steps for implementing the functions specified in one or more processes of the flowchart and/or one or more blocks of the block diagram.

In a typical configuration, a computing device includes one or more processors (CPUs), input/output interfaces, network interfaces, and memories.

The memory may include a volatile memory, a random access memory (RAM) and/or a nonvolatile memory in the computer-readable media, such as a read only memory (ROM) or a flash RAM. The memory is an example of a computer-readable medium.

The computer readable media include volatile and non-volatile media, removable and non-removable media, and information storage can be realized by any method or technology. The information may be computer-readable instructions, data structures, modules of programs, or other data. Examples of storage media of a computer include but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a read only optical disk read only memory (CD-ROM), a digital versatile disc (DVD) or other optical storage, a magnetic tape cartridge, a magnetic tape magnetic disk storage or other magnetic storage device or any other non-transmission medium can be used to store information that can be accessed by computing devices. As defined herein, the computer-readable media does not include transitory computer-readable media, such as modulated data signals and carriers.

It should be noted that, relationship terms of the disclosure such as "first" and "second" are used to distinguish one entity or operation from another entity or operation, and do not imply any such actual relationship or order between these entities or operations. Moreover, the terms "comprise", "include" or any other variations are intended to cover non-exclusive inclusion, so that a process, method, article or equipment including a series of elements includes not only those elements, but also other elements not explicitly listed, or elements inherent in such process, method, article or equipment. Without further restrictions, the elements defined by the statement "comprising a . . . " do not exclude the existence of other identical elements in the process, method, article or equipment including the elements.

The above is the specific embodiments of the present disclosure, so that those skilled in the art can understand or realize the present disclosure. Therefore, the present disclosure may not be limited to these embodiments described herein, but may conform to the widest scope consistent with the principles and novel features disclosed herein.

What is claimed is:

1. A translation method, performed by an augmented reality (AR) device, comprising:
   obtaining a text to be translated from an environment image in response to a trigger instruction;
   obtaining a translation result of the text to be translated; and
   displaying the translation result based on a preset display mode in an AR space, wherein the AR space is a virtual space constructed by the AR device based on a real environment;
   wherein obtaining the text to be translated from the environment image in response to the trigger instruction comprises:
   recognizing a user gesture in the environment image;
   determining a target text image pointed by the user gesture;
   generating the trigger instruction based on the target text image; and determining the target text image as an image of the text to be translated based on the trigger instruction;
wherein determining the target text image pointed by the user gesture comprises:
recognizing a direction of the user gesture in the environment image and at least one first text image in the environment image; determining a text image of the at least one first text image along the recognized direction as the target text image; or
collecting a new environment image based on the user gesture; recognizing a direction of the user gesture in the new environment image and at least one second text image in the new environment image; determining a text image of the at least one second text image along the recognized direction as the target text image.

2. The method of claim 1, wherein obtaining the text to be translated from the environment image in response to the trigger instruction further comprises:
obtaining the text to be translated by performing image recognition on the image of the text to be translated.

3. The method of claim 2, wherein obtaining the image of the text to be translated from the environment image in response to the trigger instruction comprises:
obtaining the image of the text to be translated by inputting the environment image into a text image recognition model in response to a voice trigger instruction sent by a user.

4. The method of claim 2, wherein obtaining the image of the text to be translated from the environment image in response to the trigger instruction comprises:
generating the trigger instruction in response to a text image being recognized from the environment image; and
determining the text image as the image of the text to be translated based on the trigger instruction.

5. The method of claim 2, further comprising:
displaying the image of the text to be translated in the AR space.

6. The method of claim 5, wherein displaying the image of the text to be translated in the AR space comprises:
obtaining an interface image from the environment image, wherein the interface image is a virtual image corresponding to an electronic display screen interface of a real display device in the real environment; and
displaying the interface image in the AR space, wherein the interface image comprises the image of the text to be translated, and covers the electronic display screen interface of the real display device in the real environment.

7. The method of claim 5, wherein the image of the text to be translated is displayed in the AR space with a style being at least one of: a gradually increased display size, a gradually increased transparency of a text background, highlighted marking, underlined marking, and displaying a preset color.

8. The method of claim 5, further comprising:
obtaining a target operation gesture for the image of the text to be translated displayed in the AR space; and
selecting a target operation mode for the target operation gesture from a mapping relationship table between operation gestures and operation modes, wherein the target operation mode is configured to operate the image of the text to be translated displayed in the AR space.

9. The method of claim 8, wherein the gesture with a palm facing up and fingers open corresponds to an operation of zooming out the image of the text to be translated, the first gesture corresponds to an operation of zooming in the image of the text to be translated, and the OK gesture corresponds to an operation of gradually increasing a text background transparency of the image of the text to be translated.

10. The method of claim 1, wherein obtaining the translation result of the text to be translated comprises at least one of:
obtaining a translation result sent by an interaction device bound to the AR device;
obtaining a translation result sent by a cloud server, wherein the translation result is generated by translating a text to be translated sent by the AR device or the interaction device; and
obtaining the text to be translated sent by the interaction device, and generating the translation result by translating the text to be translated.

11. The method of claim 1, wherein displaying the translation result in the AR space based on the preset display mode comprises:
adjusting a display definition and/or a display font size of the translation result in the AR space.

12. The method of claim 11, wherein adjusting the display definition and/or the display font size of the translation result in the AR device comprises:
gradually reducing the display definition of the translation result in the AR space and gradually increasing the display font size of the translation result.

13. An augmented reality (AR) device, comprising:
a frame,
a camera arranged on the frame, configured to collect an environment image,
a microphone arranged on the frame, configured to receive a trigger instruction sent by a user, and
a memory and a processor arranged on the frame, the memory being configured to store instructions executable by a processor, the processor being configured to: obtain a text to be translated from the environment image in response to a trigger instruction; obtain a translation result of the text to be translated and control display of the translation result based on a preset display mode in an AR space, wherein the AR space is a virtual space constructed by the AR device based on a real environment;
wherein the processor is further configured to:
recognize a user gesture in the environment image;
determine a target text image pointed by the user gesture;
generate the trigger instruction based on the target text image; and
determine the target text image as an image of the text to be translated based on the trigger instruction;
wherein the processor is further configured to perform:
recognizing a direction of the user gesture in the environment image and at least one first text image in the environment image; determining a text image of the at least one first text image along the recognized direction as the target text image; or
collecting a new environment image based on the user gesture; recognizing a direction of the user gesture in the new environment image and at least one second text image in the new environment image; determining a text image of the at least one second text image along the recognized direction as the target text image.

14. The AR device of claim 13, wherein the processor is further configured to:
obtain the text to be translated by performing image recognition on the image of the text to be translated.

15. The AR device of claim 14, wherein the camera is configured to receive a voice trigger instruction, and the processor is further configured to: obtain the image of the text to be translated by inputting the environment image into a text image recognition model in response to the voice trigger instruction.

16. The AR device of claim 14, wherein the processor is further configured to:
   generate the trigger instruction in response to a text image being recognized from the environment image; and
   determine the text image as the image of the text to be translated based on the trigger instruction.

17. A non-transitory computer readable storage medium having a computer program stored thereon, wherein when the computer program is performed by a processor, a translation method performed by an augmented reality (AR) device, the method comprising:
   obtaining a text to be translated from an environment image in response to a trigger instruction;
   obtaining a translation result of the text to be translated; and
   displaying the translation result based on a preset display mode in an AR space, wherein the AR space is a virtual space constructed by the AR device based on a real environment;
   wherein obtaining the text to be translated from the environment image in response to the trigger instruction comprises:
   recognizing a user gesture in the environment image;
   determining a target text image pointed by the user gesture;
   generating the trigger instruction based on the target text image; and
   determining the target text image as an image of the text to be translated based on the trigger instruction;
   wherein determining the target text image pointed by the user gesture comprises:
   recognizing a direction of the user gesture in the environment image and at least one first text image in the environment image; determining a text image of the at least one first text image along the recognized direction as the target text image; or
   collecting a new environment image based on the user gesture; recognizing a direction of the user gesture in the new environment image and at least one second text image in the new environment image; determining a text image of the at least one second text image along the recognized direction as the target text image.

* * * * *